United States Patent
Fujino et al.

(10) Patent No.: US 12,141,108 B2
(45) Date of Patent: Nov. 12, 2024

(54) INFORMATION PROCESSING SYSTEM, INFORMATION PROCESSING METHOD, DATA PROCESSING DEVICE, AND PROGRAM

(71) Applicant: Nippon Telegraph and Telephone Corporation, Tokyo (JP)

(72) Inventors: Tomoyuki Fujino, Musashino (JP); Yui Saito, Musashino (JP); Tomohiro Inoue, Musashino (JP); Keiichiro Kashiwagi, Musashino (JP); Kenji Umakoshi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 6 days.

(21) Appl. No.: 17/917,748

(22) PCT Filed: Apr. 10, 2020

(86) PCT No.: PCT/JP2020/016118
§ 371 (c)(1),
(2) Date: Oct. 7, 2022

(87) PCT Pub. No.: WO2021/205651
PCT Pub. Date: Oct. 14, 2021

(65) Prior Publication Data
US 2023/0161741 A1    May 25, 2023

(51) Int. Cl.
*G06F 16/21*    (2019.01)
*G06F 16/27*    (2019.01)
*G06F 21/62*    (2013.01)

(52) U.S. Cl.
CPC .......... *G06F 16/211* (2019.01); *G06F 16/27* (2019.01); *G06F 21/62* (2013.01)

(58) Field of Classification Search
CPC ........ G06F 16/211; G06F 16/27; G06F 21/62; G06F 21/6236
See application file for complete search history.

(56) References Cited

U.S. PATENT DOCUMENTS

2008/0127310 A1    5/2008  Robbins et al.
2010/0235380 A1*   9/2010  Toume .................. G06F 16/289
                                                707/769

(Continued)

FOREIGN PATENT DOCUMENTS

RU           2494446 C2 *  9/2013  ............... G06F 9/50
WO    WO 2015/114947        8/2015

*Primary Examiner* — Mark D Featherstone
*Assistant Examiner* — Kweku William Halm
(74) *Attorney, Agent, or Firm* — Fish & Richardson P.C.

(57) ABSTRACT

Provided is an information processing system that shares data between organizations A and B and performs processing. The information processing system includes a data processing apparatus 1 and data input/output apparatuses 3A and 3B that manage data in the respective organizations. The data processing apparatus 1 includes a schema information sharing unit 12 that allows sharing of schemas between the organizations A and B, the schemas specifying the data structures of data held by the respective organizations A and B, an agreement forming unit 14 that receives a data processing proposal that indicates the range of sharing data to be shared between the organizations A and B, and the processing using the sharing data as an input, and forms agreement to the data processing proposal by obtaining approval to the data processing proposal from each organization, and a processing executing unit 15 that acquires the sharing data indicated by the data processing proposal regarding which agreement has been formed from the organizations A and B, and executes the processing indicated by the data processing proposal. The data input/output apparatuses 3A and 3B each include a proposing unit 33 that (Continued)

transmits the data processing proposal to the data processing apparatus 1, an approving unit 34 that transmits approval to the data processing proposal to the data processing apparatus 1, and a data transmitting unit 35 that transmits the sharing data indicated by the data processing proposal to the data processing apparatus 1.

11 Claims, 7 Drawing Sheets

(56) References Cited

U.S. PATENT DOCUMENTS

| | | | |
|---|---|---|---|
| 2015/0012975 A1* | 1/2015 | Hotti | G06F 21/62 |
| | | | 726/4 |
| 2016/0330018 A1 | 11/2016 | Miyata et al. | |
| 2016/0371805 A1* | 12/2016 | Knotts | G06Q 50/20 |
| 2019/0251198 A1* | 8/2019 | Shamsutdinov | G06F 21/602 |
| 2022/0385455 A1* | 12/2022 | Imabayashi | G06F 21/602 |

* cited by examiner

INFORMATION PROCESSING SYSTEM, INFORMATION PROCESSING METHOD, DATA PROCESSING DEVICE, AND PROGRAM

CROSS-REFERENCE TO RELATED APPLICATIONS

This application is a National Stage application under 35 U.S.C. § 371 of International Application No. PCT/JP2020/016118, having an International Filing Date of Apr. 10, 2020, the disclosure of which is considered part of the disclosure of this application, and is incorporated by reference in its entirety into this application.

TECHNICAL FIELD

The present invention relates to an information processing system, an information processing method, a data processing device, and a program.

BACKGROUND ART

The effective utilization of customer and inhabitant data has progressed in enterprises, local governments, and the like, and recently, the analysis and utilization of data is performed in various scenes such as analysis of customer purchase tendency, improvement of business efficiency, production and distribution management, and the like. Further, IoT has attracted attention due to enabling various sensors and devices to be connected to a network, and enabling the collection and utilization of data.

CITATION LIST

Patent Literature

[PTL 1] WO 2015/114947

SUMMARY OF THE INVENTION

Technical Problem

Regarding the effective utilization of data, it is conceivable that data is shared between a plurality of organizations, and the shared data is analyzed.

When data is shared, there is a desire that the actual data of one's own organization, possibly even a portion thereof is not viewed by other organizations. Further, there is desire for a system in which agreement can be reached between organizations regarding sharing and utilization of data.

PTL 1 discloses a technique in which data for calculation is saved in a plurality of calculation agents by secret sharing, and data processing is performed in cooperation with other calculation agents without restoring original data. However, there is a problem in this technique in that the processing load is high and the description of processing is restricted.

With methods of anonymizing data such as masking a portion of data, statistical processing, hashing, and adding noise, it is possible that, with respect to data that is not anonymized, actual data is viewed by other organizations.

None of these systems provide a system in which agreement can be reached regarding sharing and utilization of data.

The present invention has been devised in view of the problem described above, and an object of the present invention is to promote sharing and utilization of data between organizations.

Means for Solving the Problem

One aspect of the present invention provides an information processing system that shares data between organizations and performs processing, the information processing system including: a data processing apparatus; and data input/output apparatuses that manage data in the respective organizations, in which the data processing apparatus includes: a schema sharing unit configured to allow sharing of schemas between the organizations, the schemas specifying data structures of data held by the respective organizations; an agreement forming unit configured to receive a data processing proposal that indicates a range of sharing data to be shared between the organizations, and processing using the sharing data as an input, and form agreement to the data processing proposal by obtaining approval to the data processing proposal from the organizations; and a processing executing unit configured to acquire the sharing data indicated by the data processing proposal regarding which agreement has been formed from the organizations, and execute the processing indicated by the data processing proposal, and the data input/output apparatuses each include: a proposing unit configured to transmit the data processing proposal to the data processing apparatus; an approving unit configured to transmit approval to the data processing proposal to the data processing apparatus; and a transmitting unit configured to transmit the sharing data indicated by the data processing proposal to the data processing apparatus.

In the information processing system described above, the processing executing unit constructs an execution environment for executing the processing of the data processing proposal using a virtualization technology, duplicates the sharing data indicated by the data processing proposal from the organizations to the execution environment, and thereafter executes the processing indicated by the data processing proposal, and discards the execution environment after execution of the processing.

Effects of the Invention

According to the present invention, sharing and utilization of data between organizations can be promoted.

DESCRIPTION OF EMBODIMENTS

Hereinafter, an embodiment of the present invention will be described with reference to the drawings.

Figure 1:
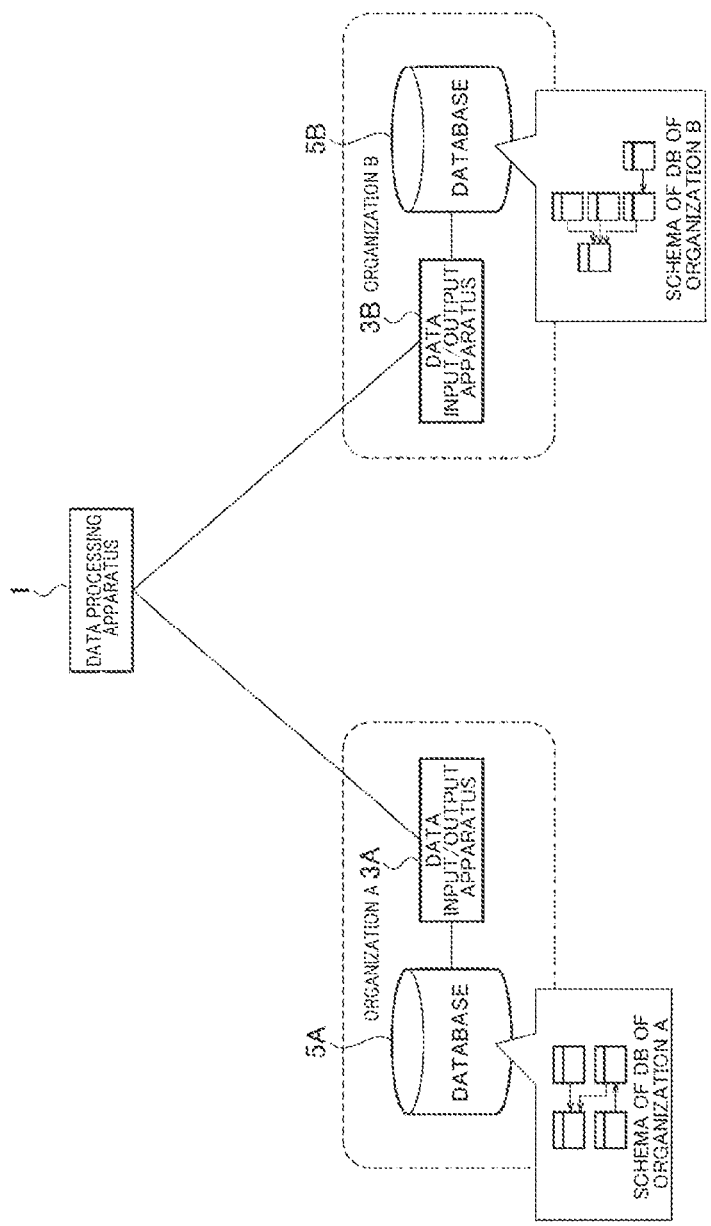
FIG. 1 is a diagram illustrating an example of an overall configuration of an information processing system.

An information processing system of the present embodiment will be described with reference to FIG. 1. The information processing system of the present embodiment provides a function of sharing and processing data between organizations A and B. Specifically, the information processing system causes the organizations A and B to share a schema for specifying the data structure, and upon receiving approval from the organizations A and B regarding a data processing proposal that indicates the range of sharing data to be shared between the organizations A and B, and the processing using the sharing data as an input, acquires the sharing data from the organizations A and B based on the data processing proposal and executes the processing indicated by the data processing proposal.

The information processing system includes a data processing apparatus 1, data input/output apparatuses 3A and 3B, and databases 5A and 5B. The data input/output apparatus 3A and the database 5A belong to the organization A, and the data input/output apparatus 3B and the database 5B belong to the organization B.

The data processing apparatus receives schemas of data owned by the respective organizations A and B, and enables inspection of the schemas of data owned by the organizations A and B. The schemas indicate the table structures of the databases 5A and 5B in which data is stored, and include information on items of a table, a relationship between tables, and the like. A user ID, time, a store ID, a purchased article ID, purchased time, and the like are envisioned as information included in the schema, for example. Data administrators of the respective organizations A and B can each know what data is owned by the other organization by referring to the schema of data owned by the other organization. Further, data administrators can apprehend what information can be obtained by performing a certain type of processing using the data owned by the own organization and the data owned by the other organization.

The data processing apparatus 1 receives a data processing proposal indicating the range of sharing data to be shared between the organizations A and B and the processing using the sharing data as an input, and requests the organizations A and B to approve the proposal.

The data processing apparatus 1, upon obtaining approval to the proposal, acquires the sharing data from the organizations A and B, executes the proposed processing, and transmits the processing result to the organizations A and B.

The data input/output apparatuses 3A and 3B transmit the schemas of data owned by the respective organizations A and B to the data processing apparatus 1, and allows the organizations A and B to share the schemas.

The data input/output apparatuses 3A and 3B transmit a data processing proposal to the data processing apparatus 1, and if the proposal is approved, acquire data to be shared from the databases 5A and 5B, transmit data to be shared to the data processing apparatus 1, and receive the processing result from the data processing apparatus 1.

Note that data will not be directly transmitted and received between the data input/output apparatuses 3A and 3B.

The databases 5A and 5B store data respectively managed by the organizations A and B. The schemas and the sharing data of the databases 5A and 5B are transmitted to the data processing apparatus 1 via the data input/output apparatuses 3A and 3B. The databases 5A and 5B can use a relational database.

Note that the organizations A and B may be different organizations in the same enterprise, or may be different enterprises. The number of organizations that share data is not limited to two, and data may be shared between three or more organizations.

Figure 2:
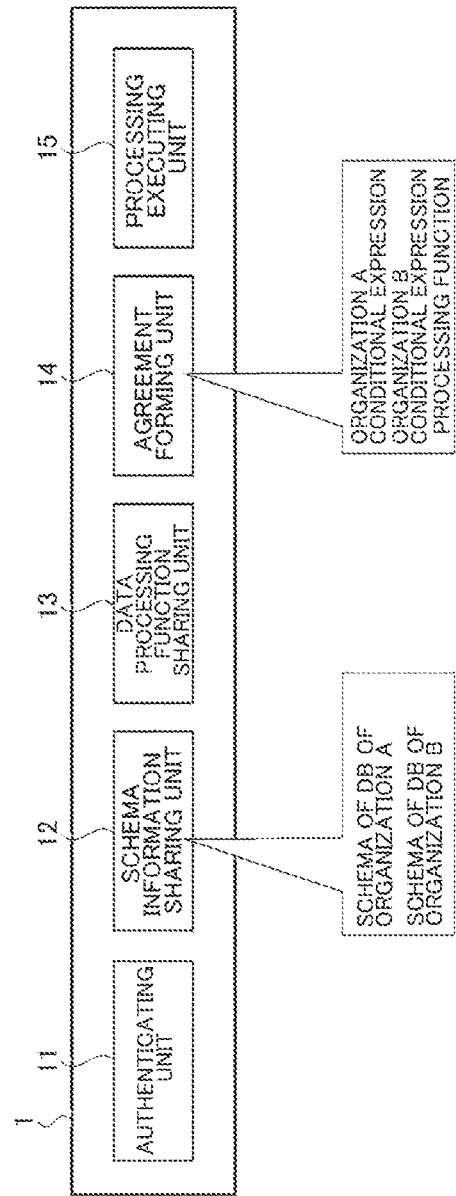
FIG. 2 is a functional block diagram illustrating an example of a configuration of a data processing apparatus.

Next, the data processing apparatus will be described with reference to FIG. 2. The data processing apparatus 1 shown in the drawing includes an authenticating unit 11, a schema information sharing unit 12, a data processing function sharing unit 13, an agreement forming unit 14, and a processing executing unit 15.

The authenticating unit 11 establishes safe sessions between the data processing apparatus 1 and the data input/output apparatuses 3A and 3B. The authenticating unit 11 establishes safe sessions with the data input/output apparatuses 3A and 3B by performing server/client authentication of Transport Layer Security (TLS), for example. The communication between the data processing apparatus 1 and the data input/output apparatuses 3A and 3B is performed through the safe sessions.

The schema information sharing unit 12 holds the schemes of data owned by the respective organizations A and B, and transmits the schemas to the data input/output apparatuses 3A and 3B in response to a request from the data input/output apparatuses 3A and 3B.

The data processing function sharing unit 13 manages processing to be performed on sharing data received from the data input/output apparatuses 3A and 3B. This processing is statistical processing, which includes a JOIN sentence of SQL, that is performed across the plurality, of databases 5A and 5B, and is processing for obtaining a correlation coefficient between columns after JOIN is performed at a specific column, for example. The processing to be performed by the data processing apparatus 1 is not limited thereto.

The agreement forming unit 14 receives a data sharing proposal from the data input/output apparatuses 3A and 3B, obtains approval to a data processing proposal indicating the range of sharing data to be shared and the processing using the sharing data as an input from each of the organizations A and B, and forms an agreement with respect to the data processing proposal. The data sharing proposal includes a conditional expression representing the range of data to be shared from the own organization, and a conditional expression representing the range of data desired to be shared from the other organization. The conditional expression is a SELECT sentence including a WHERE phrase of SQL, for example. The processing using the sharing data as an input included in the data processing proposal is a processing function described by a data administrator who makes a proposal of data sharing.

The agreement forming unit 14 transmits a data processing proposal to the data input/output apparatuses 3A and 3B, and obtains approval to the proposal. Upon obtaining approval from each of the organizations A and B, the agreement forming unit 14 regards that agreement is formed between the organizations A and B, and causes the processing executing unit 15 to execute the proposed processing.

The processing executing unit 15 executes processing in accordance with the data processing proposal, and transmits the processing result to the data input/output apparatuses 3A and 3B. The processing executing unit 15 is isolated so as not to connect to apparatuses other than the data input/output apparatuses 3A and 3B, using a virtualization technology, and forms an application execution environment for executing only the processing indicated by the data processing proposal. Under the application execution environment, sharing data that satisfies the conditional expression is acquired from the data input/output apparatuses 3A and 3B, and the processing indicated by the data processing proposal is executed. The application execution environment is designed such that accessing from external apparatuses is prohibited except for inputting of sharing data from the data input/output apparatuses 3A and 3B, and only the processing indicated by the data processing proposal is executed. A Docker container can be used in the application execution environment, for example. The processing executing unit 15 performs deletion of the Docker container and complete data erasure of a specific region by a shred command, as post-processing.

Figure 3:
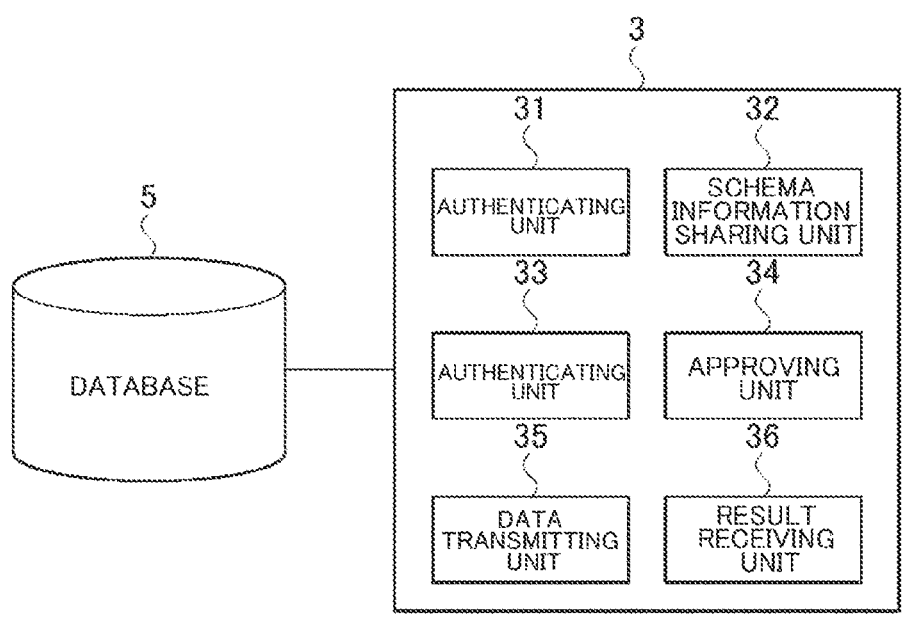
FIG. 3 is a functional block diagram illustrating an example of a configuration of a data input/output apparatus.

Next, the data input/output apparatus will be described with reference to FIG. 3. The data input/output apparatus 3 shown in the drawing includes an authenticating unit 31, a schema information sharing unit 32, a proposing unit 33, an approving unit 34, a data transmitting unit 35, and a result receiving unit 36. The data input/output apparatuses 3A and 3B of the organizations A and B are configured similarly to the data input/output apparatus 3 shown in FIG. 3. The database 5 connected to the data input/output apparatus 3 indicates the databases 5A and 5B of the organizations A and B.

The authenticating unit 31 establishes a safe session with the data processing apparatus 1.

The schema information sharing unit 32 transmits the schema of the database 5 of the own organization to the data processing apparatus 1. Further, the schema information sharing unit 32 acquires the schema of the database 5 of the other organization from the data processing apparatus 1.

The data administrator describes desired processing by referring to the schema of the own organization and the schema of the other organization that are acquired by the schema information sharing unit 32. The method of describing processing is not limited, and the processing need only be processing that can be executed by the processing executing unit 15. The processing can be described with a language that is general purpose and is widely used such as SQL, Python, or R, for example.

The proposing unit 33 transmits processing using the sharing data as an input to the data processing apparatus 1. The proposing unit 33 also transmits, to the data processing apparatus 1, a data sharing proposal including a conditional expression representing the range of data to be shared from the own organization, and a conditional expression representing the range of data desired to be shared from the other organization.

The approving unit 34 receives a data processing proposal, and presents the data processing proposal to the data administrator of the own organization, and transmits approval to the data processing apparatus 1.

The data transmitting unit 35, when the agreed data processing proposal is executed, acquires data to be shared from the database 5, and transmits the data to be shared to the data processing apparatus 1.

The result receiving unit 36 receives a processing result from the data processing apparatus 1.

Figure 4:
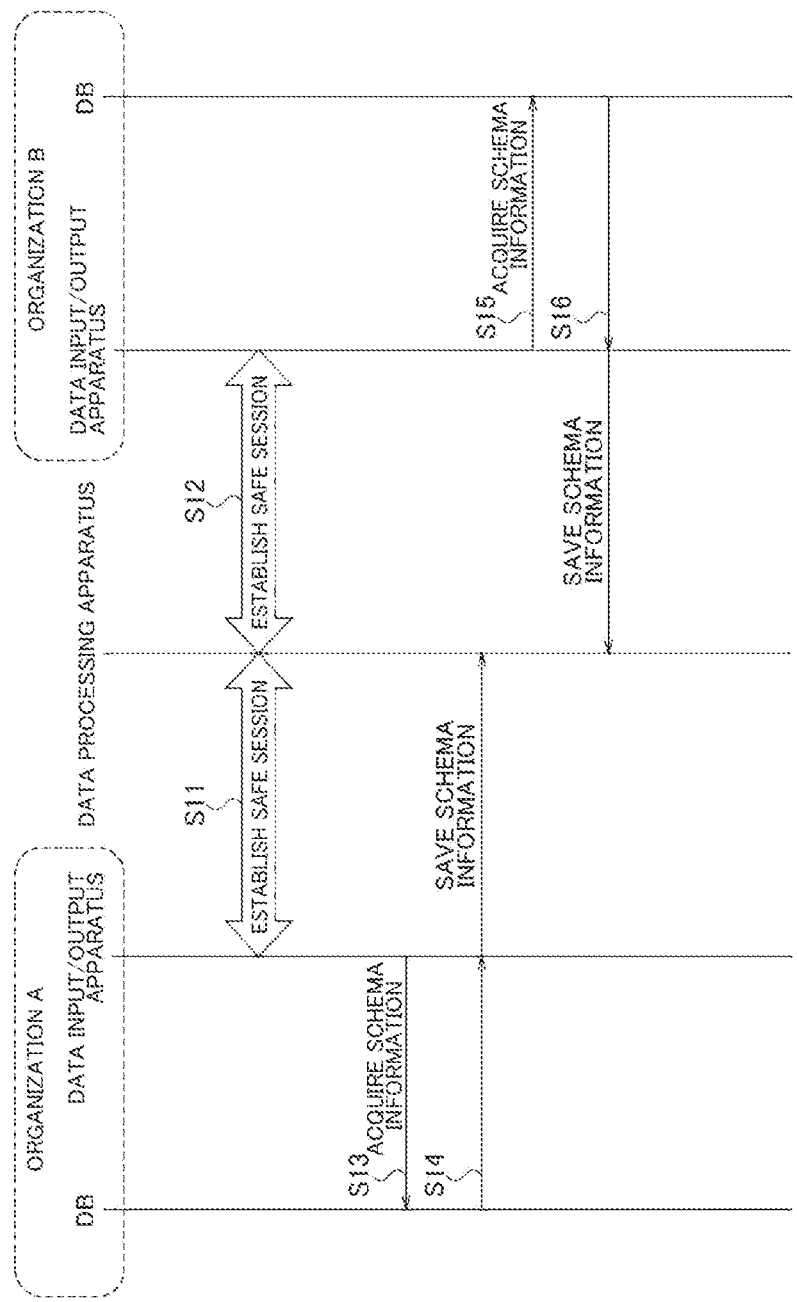
FIG. 4 is a sequence diagram illustrating an example of a processing flow of the information processing system.
Figure 5:
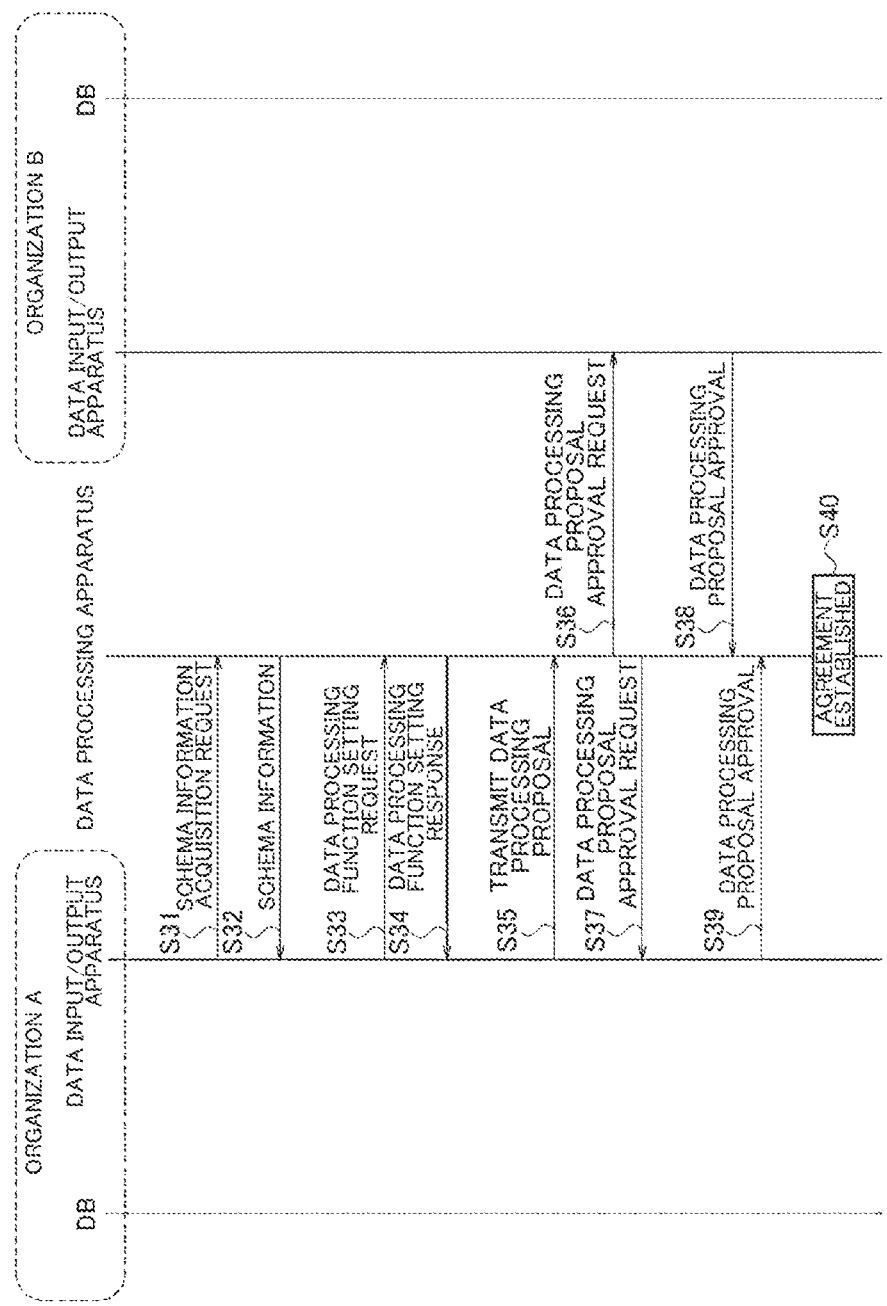
FIG. 5 is a sequence diagram illustrating an example of a processing flow of the information processing system.

Next, the operations of the information processing system of the present embodiment will be described using the sequence diagrams in FIGS. 4 to 6.

First, the processing for sharing a schema will be described with reference to the sequence diagram in FIG. 4.

In step S11, the data input/output apparatus 3A performs mutual authentication with the data processing apparatus 1, and establishes an encrypted safe communication channel.

In step S12, the data input/output apparatus 3B establishes a safe communication channel with the data processing apparatus 1, similarly to the data input/output apparatus 3A.

In step S13, the data input/output apparatus 3A requests acquisition of a schema to the database 5A.

In step S14, the data input/output apparatus 3A transmits the schema acquired from the database 5A to the data processing apparatus 1. The data processing apparatus 1 holds the schema of the database 5A of the organization A, and allows inspection of the schema.

Similarly in the organization B, in step S15, the data input/output apparatus 3B requests acquisition of a schema to the database 5B, and in step S16, the data input/output apparatus 3B transmits the schema acquired from the database 5B to the data processing apparatus 1. The data processing apparatus 1 holds the schema of the database 5B of the organization B, and allows inspection of the schema.

Next, the processing for forming agreement between organizations regarding data sharing will be described with reference to the sequence diagram in FIG. 5. Here, an example in which the organization A makes a proposal is shown, but the processing can be similarly applied to a case where the organization B makes a proposal.

In step S31, the data input/output apparatus 3A transmits a schema information acquisition request to the data processing apparatus 1, and in step S32, the data input/output apparatus 3A receives schema information from the data processing apparatus 1. The schema information includes the schema of the database 5A of the organization A and the schema of the database 5B of the organization B that are held by the data processing apparatus 1.

The data administrator of the organization A describes a processing function for executing the desired processing by referring to the schema information.

In step S33, the data input/output apparatus 3A transmits a data processing function setting request to the data processing apparatus 1, and registers the processing function in the data processing apparatus 1.

In step S34, the data input/output apparatus 3A receives a data processing function setting response from the data processing apparatus 1.

In step S35, the data input/output apparatus 3A transmits a data processing proposal to the data processing apparatus 1. The data processing proposal includes a conditional expression representing the range of data to be shared from the organization A, a conditional expression representing the range of data desired to be shared from the organization B, and processing details. The processing details may be information for specifying the processing function registered in the data processing apparatus 1, and may also be the processing function itself.

In step S36, the data processing apparatus 1 transmits an approval request of the data processing proposal to the organization B. The data processing apparatus 1 also transmits an approval request of the data processing proposal to the organization A in step S37. Note that the data processing proposal in the present example is made by the organization A, and therefore the processing in step S37 need not be performed.

A data administrator of the organization B checks the data processing proposal included in the approval request. The data processing proposal includes the range of sharing data of the organization A, the range of sharing data of the organization B, and the processing details.

If the data administrator of the organization B accepts the data processing proposal, in step S38, the data input/output apparatus 5B notifies the data processing apparatus 1 of information that the data processing proposal has been approved.

Note that, if the data administrator of the organization B does not accept the data processing proposal, the organization B may transmit, to the data processing apparatus 1, a data processing proposal in which the range of sharing data of the organization A or the range of sharing data of the organization B is revised. The data processing apparatus 1 transmits an approval request of the revised data processing proposal to the organization A. Alternatively, the organization B may notify the data processing apparatus 1 of the disapproval of the data processing proposal.

In step S39, the data input/output apparatus 5A notifies the data processing apparatus 1 of information that the data administrator of the organization A has approved the data processing proposal. Note that, if the data processing proposal that has been transmitted by the organization A is not revised, the processing in step S39 may be omitted.

Figure 6:
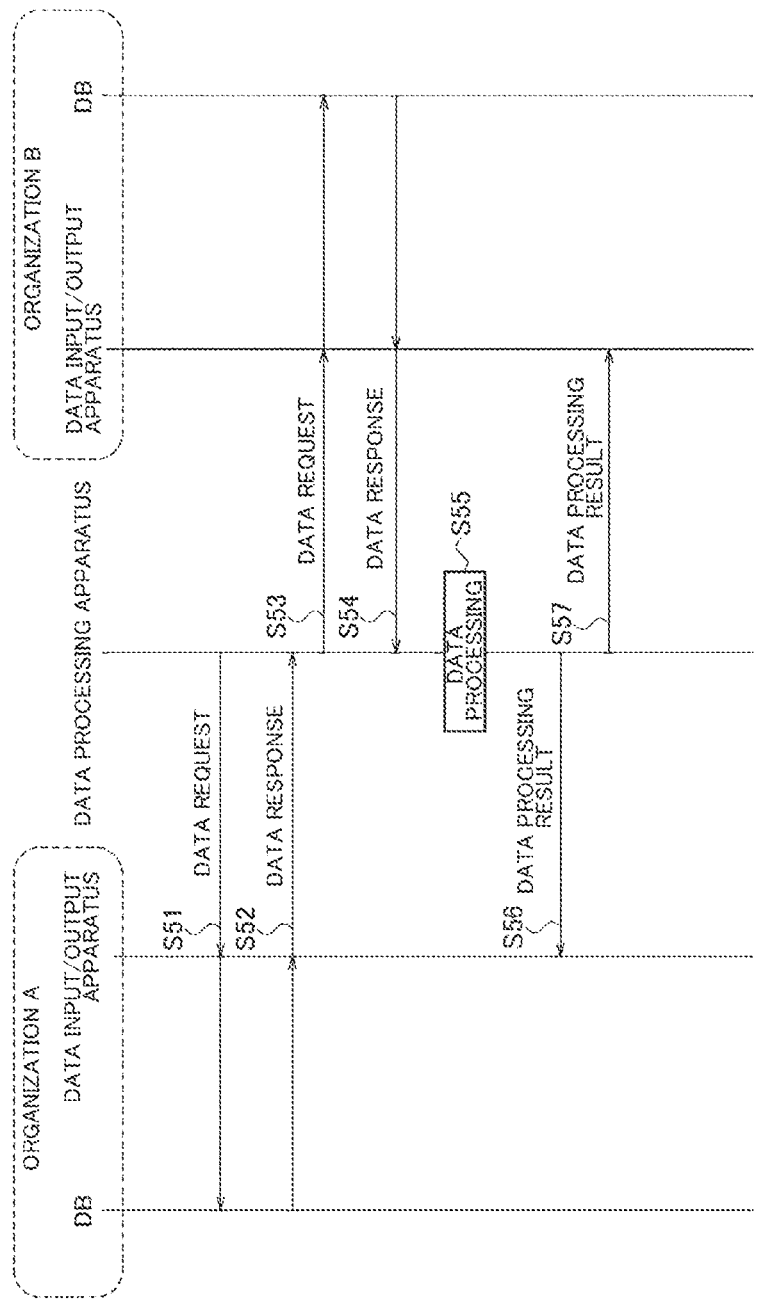
FIG. 6 is a sequence diagram illustrating an example of a processing flow of the information processing system.

Upon obtaining approval from both of the organizations A and B, in step S40, the data processing apparatus 1 regards that the agreement has been established with respect to the proposal from the organization A, creates an application execution environment for executing the proposed processing, and starts execution of the data processing shown in FIG. 6. The data processing apparatus 1 may store and manage the agreed data processing proposal in a storage apparatus.

Subsequently, the processing of executing the agreed proposal will be described with reference to the sequence diagram in FIG. 6. The processing of the data processing apparatus 1 shown in FIG. 6 is processing to be executed in the application execution environment.

In step S51, the data processing apparatus 1 requests, to the data input/output apparatus 3A, sharing data that satisfies the conditional expression representing the range of data to be shared from the organization A.

In step S52, the data input/output apparatus 3A acquires sharing data that satisfies the conditional expression from the database 5A, and transmits the sharing data to the data processing apparatus 1.

In step S53, the data processing apparatus 1 requests, to the data input/output apparatus 3B, sharing data that satisfies the conditional expression representing the range of data to be shared from the organization B.

In step S54, the data input/output apparatus 3B acquires sharing data that satisfies the conditional expression from the database 5B, and transmits the sharing data to the data processing apparatus 1.

The sharing data received from each of the organizations A and B is stored in a database that is constructed in the application execution environment.

In step S55, the data processing apparatus 1 executes the processing of the agreed proposal.

In steps S56 and S57, the data processing apparatus 1 transmits the processing result to both of the data input/output apparatuses 3A and 3B.

Upon completing transmission of the processing result, the data processing apparatus 1 deletes the application execution environment together with the sharing data received from the organizations A and B.

As described above, the information processing system of the present embodiment is an information processing system that shares data between organizations A and B and performs processing, and includes a data processing apparatus 1 and data input/output apparatuses 3A and 3B that manage data in the respective organizations. The data processing apparatus includes a schema information sharing unit 12 that allows schemas, that specify the data structure of data held by the respective organizations A and B to be shared between the organizations A and B, an agreement forming unit 14 that receives a data processing proposal that indicates the range of sharing data to be shared between the organizations A and B, and the processing using the sharing data as an input, and forms agreement to the data processing proposal by obtaining approval to the data processing proposal from each organization, and a processing executing unit 15 that acquires the sharing data indicated by the data processing proposal regarding which agreement has been formed from the organizations A and B, and executes the processing indicated by the data processing proposal. The data input/output apparatuses 3A and 3B each include a proposing unit 33 that transmits the data processing proposal to the data processing apparatus 1, an approving unit 34 that transmits approval to the data processing proposal to the data processing apparatus 1, and a data transmitting unit 35 that transmits the sharing data indicated by the data processing proposal to the data processing apparatus 1. By sharing the schemas of data owned by the respective organizations A and B, it is possible to apprehend the information that can be obtained by performing processing by combining the data of own organization and the data of other organizations. Further, agreement regarding the range of sharing data to be shared and the processing for the sharing data can be formed between the organizations A and B, and therefore data owner can provide data to other organizations without worry.

In the information processing system of the present embodiment, the processing executing unit 15 constructs an execution environment for executing the processing of the data processing proposal using a virtualization technology, duplicates the sharing data indicated by the data processing proposal from the organizations A and B to the execution environment, and thereafter executes the processing indicated by the data processing proposal, and discards the execution environment after execution of the processing. Accordingly, only the sharing data is copied to the execution environment, and the sharing data is discarded after execution of the processing, and therefore the processing can be executed while conceal in the data held by the organizations A and B.

Figure 7:
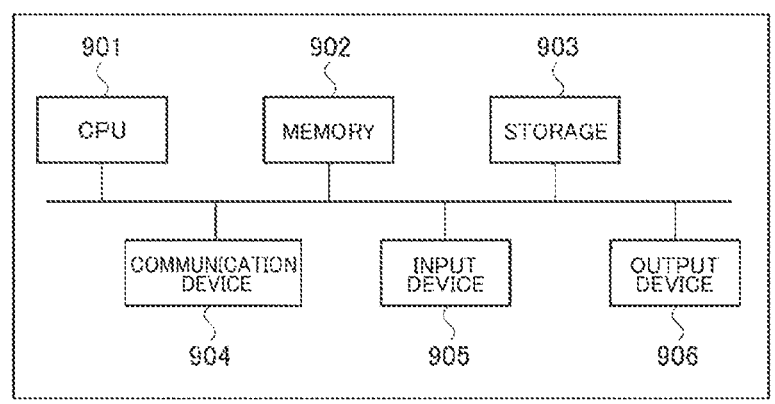
FIG. 7 is a diagram illustrating an example of hardware configurations of the data processing apparatus and the data input/output apparatus.

As the data processing apparatus 1 and the data input/output apparatuses 3A and 3B described above, a General purpose computer system as shown in FIG. 7 can be used, for example. The general purpose computer system includes a central processing unit (CPU) 901, a memory 902, a storage 903, a communication device 904, an input device 905, and an output device 906. By the CPU 901 executing a predetermined program that has been loaded in the memory 902, in this computer system, the data processing apparatus 1 and the data input/output apparatuses 3A and 3B are realized. This program can be recorded in a computer-readable recording medium such as a magnetic disk, an optical disk, or a semiconductor memory, or can also be distributed via a network.

REFERENCE SIGNS LIST

1 Data processing apparatus
11 Authenticating unit
12 Schema information sharing unit
13 Data processing function sharing unit
14 Agreement forming unit 15 Processing executing unit
3, 3A, 3B Data input/output apparatus
31 Authenticating unit
32 Schema information sharing unit
33 Proposing unit
34 Approving unit
35 Data transmitting unit
36 Result receiving unit
5, 5A, 5B Database

The invention claimed is:

1. An information processing system comprising:
a data processing apparatus; and
data input/output apparatuses configured to manage data in respective organizations,
wherein the data processing apparatus includes:
   a schema sharing unit, including one or more processors, configured to allow sharing of schemas between the organizations, the schemas specifying data structures of data held by the respective organizations;
   an agreement forming unit, including one or more processors, configured to receive a data processing proposal that includes (i) a range of sharing data to be shared with the data processing apparatus by each of the organizations and (ii) a process to be performed, by the data processing apparatus, on the range of the sharing data shared by each of the organizations, and form agreement to the data processing proposal by obtaining approval to the data processing proposal from the organizations; and
   a processing executing unit, including one or more processors, configured to acquire, from each of the organizations, the sharing data indicated by the data processing proposal regarding which approval was obtained from the organizations, and execute the processing of the acquired sharing data indicated by the data processing proposal, and transmit one or more results of the processing to each of the organizations, wherein the execution of the processing and the transmission of the one or more results is performed by the one or more processors while the sharing data obtained from each of the organizations is concealed from other organizations among the organizations, and
wherein each of the data input/output apparatuses includes:
   a proposing unit, including one or more processors, configured to transmit the data processing proposal to the data processing apparatus;
   an approving unit, including one or more processors, configured to transmit approval to the data processing proposal to the data processing apparatus; and
   a transmitting unit, including one or more processors, configured to transmit the sharing data indicated by the data processing proposal to the data processing apparatus.

2. The information processing system according to claim 1, wherein
the processing executing unit is configured to construct an execution environment for executing the processing of the data processing proposal using a virtualization technology, duplicate the sharing data indicated by the data processing proposal from the organizations to the execution environment, and thereafter execute the processing indicated by the data processing proposal, and discard the execution environment after execution of the processing.

3. An information processing method comprising the steps of:
at a data processing apparatus:
   allowing sharing of schemas between organizations, the schemas specifying data structures of data held by the respective organizations;
   receiving a data processing proposal that includes (i) a range of sharing data to be shared with the data processing apparatus by each of the organizations and (ii) a process to be performed, by the data processing apparatus, on the range of the sharing data shared by each of the organizations, and forming agreement to the data processing proposal by obtaining approval to the data processing proposal from the organizations; and
   acquiring, from each of the organizations, the sharing data indicated by the data processing proposal regarding which approval was obtained from the organizations, and executing the processing of the acquired sharing data indicated by the data processing proposal, and transmit one or more results of the processing to each of the organizations, wherein the execution of the processing and the transmission of the one or more results are performed while the sharing data obtained from each of the organizations is concealed from other organizations among the organizations, and
at a data input/output apparatus:
   transmitting the data processing proposal to the data processing apparatus;
   transmitting approval to the data processing proposal to the data processing apparatus; and
   transmitting the sharing data indicated by the data processing proposal to the data processing apparatus.

4. The information processing method according to claim 3, wherein
in the executing of the processing indicated by the data processing proposal, an execution environment for executing the processing of the data processing proposal is constructed using a virtualization technology, the sharing data indicated by the data processing proposal is duplicated from the organizations to the execution environment, and thereafter the processing indicated by the data processing proposal is executed, and the execution environment is discarded after execution of the processing.

5. A data processing apparatus comprising:
A schema sharing unit, including one or more processors, configured to allow sharing of schemas between the organizations, the schemas specifying data structures of data held by respective organizations;
an agreement forming unit, including one or more processors, configured to receive a data processing proposal that includes (i) a range of sharing data to be shared with the data processing apparatus by each of the organizations and (ii) a process to be performed, by the data processing apparatus, on the range of the sharing data shared by each of the organizations, and form agreement to the data processing proposal by obtaining approval to the data processing proposal from the organizations; and
a processing executing unit, including one or more processors, configured to acquire, from each of the organizations, the sharing data indicated by the data processing proposal regarding which approval was obtained from the organizations, and execute the processing of the acquired sharing data indicated by the data processing proposal, and transmit one or more results of the processing to each of the organizations, wherein the execution of the processing and the transmission of the one or more results is performed by the one or more processors while the sharing data obtained from each of the organizations is concealed from other organizations among the organizations.

6. The data processing apparatus according to claim 5, wherein
the processing executing unit is configured to construct an execution environment for executing the processing of the data processing proposal using a virtualization technology, duplicate the sharing data indicated by the data processing proposal from the organizations to the execution environment, and thereafter execute the processing indicated by the data processing proposal, and discard the execution environment after execution of the processing.

7. A non-transitory computer-readable storage medium storing a program for causing a computer to function as the units of the data processing apparatus according to claim 5.

8. A non-transitory computer-readable storage medium storing a program for causing a computer to function as the units of the data processing apparatus according to claim 6.

9. The information processing system according to claim 1, wherein the data processing proposal includes (i) a first conditional expression representing a first range of data to be shared from one of the organizations, (ii) a second conditional expression representing a second range of data to be shared from another organization, and (iii) processing information regarding the process using the sharing data as the input, and
wherein the processing information specifies a processing function.

10. The information processing method according to claim 3, wherein the data processing proposal includes (i) a first conditional expression representing a first range of data to be shared from one of the organizations, (ii) a second conditional expression representing a second range of data to be shared from another organization, and (iii) processing information regarding the process using the sharing data as the input, and
wherein the processing information specifies a processing function.

11. The data processing apparatus according to claim 5, wherein the data processing proposal includes (i) a first conditional expression representing a first range of data to be shared from one of the organizations, (ii) a second conditional expression representing a second range of data to be shared from another organization, and (iii) processing information regarding the process using the sharing data as input, and
wherein the processing information specifies a processing function.

* * * * *